United States Patent
Kim et al.

(10) Patent No.: US 11,032,366 B2
(45) Date of Patent: Jun. 8, 2021

(54) NODE DEVICE ON BLOCKCHAIN NETWORK FOR PROCESSING TRANSACTION

(71) Applicant: AJOU UNIVERSITY INDUSTRY-ACADEMIC COOPERATION FOUNDATION, Suwon-si (KR)

(72) Inventors: Jai Hoon Kim, Seongnam-si (KR); Kwang Hoon Choi, Suwon-si (KR); Dae Han Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 16/790,938

(22) Filed: Feb. 14, 2020

(65) Prior Publication Data
US 2020/0267215 A1    Aug. 20, 2020

(30) Foreign Application Priority Data
Feb. 18, 2019  (KR) .......................... 10-2019-0018808

(51) Int. Cl.
*H04L 29/08* (2006.01)
*G06F 16/27* (2019.01)

(52) U.S. Cl.
CPC ............ *H04L 67/108* (2013.01); *G06F 16/27* (2019.01)

(58) Field of Classification Search
CPC ............................... H04L 67/108; G06F 16/27
See application file for complete search history.

(56) References Cited

U.S. PATENT DOCUMENTS

2017/0148021 A1* 5/2017 Goldstein ............ H04L 63/0281
2020/0160289 A1* 5/2020 Mahajan ............... H04L 63/123

* cited by examiner

*Primary Examiner* — Kristie D Shingles
(74) *Attorney, Agent, or Firm* — Sughrue Mion, PLLC

(57) ABSTRACT

A node device on a blockchain network is provided. The node device includes a blockchain state monitor that calculates an estimated time of transaction processing completion according to a transaction cost by using state information about the blockchain network, a transaction cost determiner that calculates a minimum transaction cost that satisfies a user's requirements by using the calculated estimated time of transaction processing completion, and a transaction processor that processes a transaction of the user in response to a first transaction processing request when the first transaction processing request, which pays a transaction cost equal to or greater than the minimum transaction cost, is generated by the user.

9 Claims, 3 Drawing Sheets

NODE DEVICE ON BLOCKCHAIN NETWORK FOR PROCESSING TRANSACTION

CROSS-REFERENCE TO RELATED APPLICATION

This application claims the benefit of Korean Patent Application No. 10-2019-0018808, filed on Feb. 18, 2019, in the Korean Intellectual Property Office, the disclosure of which is incorporated herein in its entirety by reference.

BACKGROUND

1. Field

The present disclosure relates to a blockchain network node device for processing transactions.

2. Description of Related Art

Blockchain is distributed ledger storage and processing platform technology that greatly improves reliability, availability, etc. by overlapping shared data and mutual contracts across multiple computing nodes. On a blockchain network, data and mutual contracts are written block by block and mutually verified by computing nodes that constitute the blockchain network. Incentives are provided to nodes (hereinafter referred to as participating nodes) that participate in block generation and mutual verification. Incentives include compensation for block generation and the cost of transactions contained in a block. On the other hand, a transaction generator who generates a transaction and requests processing of it has to pay for the transaction as a fee. The higher the transaction cost, the earlier a transaction corresponding thereto may be included in the block, and thus, a processing speed may be improved. However, the burden of the transaction generator may increase as the transaction cost increases.

In a general transaction, it is desirable that the transaction be terminated within a short time, but in a real-time application it is important that a user-generated transaction is completed within a deadline. In addition, in systems other than blockchain, it is important that limited computing resources (e.g. CPU, network, storage, etc.) are efficiently used, but in blockchain systems, in addition to general computing resources, a new type of cost, called transaction cost, has to be considered.

SUMMARY

Various embodiments according to the present disclosure provide a blockchain network node for processing transactions in consideration of transaction deadlines and transaction costs. The technical goal to be achieved by the present disclosure is not limited to the above technical goal, and other technical goals may be inferred from the following embodiments.

Additional aspects will be set forth in part in the description which follows and, in part, will be apparent from the description, or may be learned by practice of the presented embodiments of the disclosure.

According to an embodiment, a node device on a blockchain network includes: a blockchain state monitor that calculates an estimated time of transaction processing completion according to a transaction cost by using state information about the blockchain network; a transaction cost determiner that calculates a minimum transaction cost that satisfies a user's requirements by using the calculated estimated time of transaction processing completion; and a transaction processor that processes a transaction of the user in response to a first transaction processing request when the first transaction processing request, which pays a transaction cost equal to or greater than the minimum transaction cost, is generated by the user.

According to another embodiment, a node device on a blockchain network includes: a blockchain state monitor that calculates an estimated time of transaction processing completion according to a transaction cost by using state information about the blockchain network; a transaction cost determiner that determines whether a user's requirements are satisfied according to a transaction cost presented by the user by using the calculated estimated time of transaction processing completion; and a transaction processor responsive to a transaction processing request of the user according to whether the user's requirements are satisfied.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
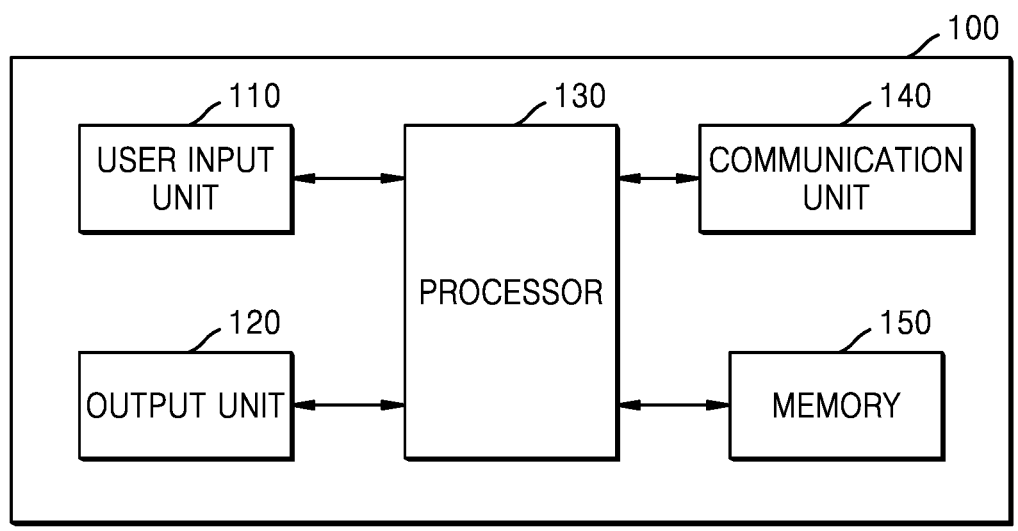
FIG. 1 is a block diagram illustrating a configuration of a node device according to some embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms such as "include" or "comprise" as used herein are not to be construed as necessarily including all of the various components or steps described in the specification, some of which may not be included, or has to be construed as further including additional components or steps.

Also, although terms including ordinals such as "first" or "second" may be used herein to describe various elements or components, these elements or components should not be limited by these terms. These terms are only used to distinguish one element or component from another element or component.

In the present specification, a "blockchain" may refers to a distributed peer-to-peer (P2P) system of a ledger that uses a software element composed of algorithms in which blocks connected in sequence negotiate usage history information of a service by using encryption and security techniques to secure and maintain integrity. In this case, the distributed P2P system may be a special type of distributed system. In addition, the distributed P2P system allows all nodes of a network to provide resources (processing capacity, storage space, data or network bandwidth, etc.) to each other without coordination of a central node. In addition, a "blockchain" may denote a distributed ledger technology in which a ledger that records usage history information is distributed to a P2P network, not a central server of a certain institution and jointly recorded and managed by the nodes in the network.

In this specification, a "node" may refer to a component within a blockchain network. For example, the node may be a special-purpose computer, a general-purpose computer, a supercomputer, a mainframe computer, a personal computer, a smartphone, a tablet PC, or the like, but is not limited thereto.

In the present specification, a "user" is a person who generates a transaction, and may request that the transaction be processed by using a node device constituting a blockchain network.

FIG. 1 is a block diagram illustrating a configuration of a node device 100 according to some embodiments. The node device 100 includes a processor 130, a communication unit 140, and a memory 150. The node device 100 may further include a user input unit 110 and an output unit 120. However, the node device 100 may be implemented by more components than the components illustrated in FIG. 1, or may be implemented by fewer components than the illustrated components.

The user input unit 110 refers to a unit for a user to input data for controlling the node device 100. For example, the user input unit 110 may include a key pad, a dome switch, a touch pad (contact capacitive type, pressure resistive layer type, infrared sensing type, surface ultrasonic conduction type, integral tension measuring type, piezo effect type, etc.), a jog wheel, a jog switch, and the like, but is not limited thereto.

According to some embodiments, the user input unit 110 may receive an input for requirements desired by a user in processing a transaction. In addition, the user input unit 110 may receive an input for a transaction cost and a transaction processing request presented by the user for processing a transaction.

The output unit 120 may output an audio signal, a video signal, or a vibration signal. Although not shown in FIG. 1, the output unit 120 may include at least one of a display unit, a sound output unit, and a vibration motor.

According to some embodiments, the output unit 120 may output a result of performing an operation according to a transaction processing request of the user. For example, as the transaction processing request of the user occurs, a predetermined operation may be performed in the node device 100, and a result of performing the predetermined operation may be output through the output unit 120.

The processor 130 generally controls the overall operation of the node device 100. For example, the processor 130 may control the user input unit 110, the output unit 120, the communication unit 140, and the like by executing programs stored in the memory 150. The node device 100 may include at least one processor.

The processor 130 may be configured to execute instructions of a computer program by performing basic arithmetic, logic, and input/output operations. The instructions may be provided from the memory 150 to the processor 130 or may be received through the communication unit 140 and provided to the processor 130. For example, the processor 130 may be configured to execute instructions in accordance with program code stored in a recording device, such as a memory.

According to some embodiments, the processor 130 may determine the appropriateness of a minimum transaction cost or a transaction cost presented by the user, based on the user's requirements for the transaction and state information about a blockchain network. In addition, the processor 130 may process the transaction in response to the transaction processing request of the user according to this determination. Detailed description thereof will be described later with reference to other drawings.

The communication unit 140 may include one or more components that allow the node device 100 to communicate with another node device (not shown) or an external device (not shown) included in the blockchain network. For example, the communication unit 140 may include a short range communicator, a mobile communicator, and a broadcast receiver.

According to some embodiments, the communication unit 140 may transfer a transaction requested by the user to at least one other node device participating in the blockchain network. For example, when a transaction processing request that satisfies a user's requirements occurs, the communication unit 140 may transmit a corresponding transaction to the at least one other node device so as to verify validity of the transaction.

The memory 150 may store a program for operating and controlling the processor 130, and may store data input to or output from the node device 100.

According to some embodiments, the memory 150 may store information related to a smart contract and a distributed ledger as information related to the blockchain. For example, the memory 150 may be a blockchain database that stores all or some blocks of the entire blockchain. According to some embodiments, the memory 150 may further store state information about a blockchain network in which the node device 100 is included. For example, based on the state information about the blockchain network stored in the memory 150, the node device 100 may calculate an estimated time of transaction processing completion according to a transaction cost.

The memory 150 may include at least one storage medium selected from among a flash memory-type, hard disk-type, multimedia card micro-type, or card-type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk, but is not limited thereto.

Figure 2:
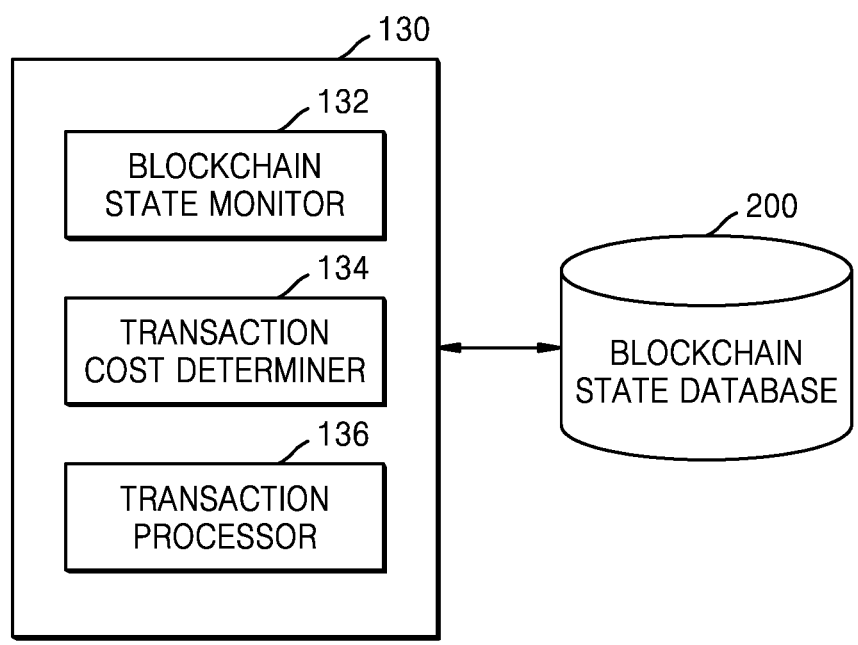
FIG. 2 is a block diagram illustrating a configuration of a processor of a node device according to some embodiments.

FIG. 2 is a block diagram illustrating a configuration of the processor 130 of the node device 100 according to some embodiments. The processor 130 may be configured to execute program code for the functions of a blockchain state monitor 132, a transaction cost determiner 134, and a transaction processor 136. The program code may be stored in a recording device, such as the memory 150. The blockchain state monitor 132, the transaction cost determiner 134, and the transaction processor 136 are illustrated separately to describe respective functions. Accordingly, the processor 130 may include at least one processor configured to perform the function of each of the blockchain state monitor 132, the transaction cost determiner 134, and the transaction processor 136.

The blockchain state monitor 132 calculates an estimated time of transaction processing completion according to a transaction cost by using the state information about the blockchain network. According to some embodiments, the blockchain state monitor 132 may periodically calculate the estimated time of transaction processing completion according to the transaction cost.

The estimated time of transaction processing completion may refer to an estimated time until a block including a transaction is added to the blockchain after a request for the processing of the transaction occurs. That is, the estimated time of transaction processing completion may refer to an estimated time to take until a block including a transaction is added to the blockchain after the block including the transaction is generated and transmitted to other node devices in the blockchain network and then the validity of the transaction is verified by the other node devices.

The state information about the blockchain network is information stored in a blockchain state database 200 and refers to information representing the overall situation of the blockchain network. For example, the state information about the blockchain network may include at least one of a block generation cycle, a block generation time, a transaction processing request frequency, and the number of transactions being processed.

The blockchain state monitor 132 may obtain the state information about the blockchain network periodically or in real time from the blockchain state database 200. In some embodiments, the blockchain state database 200 may be implemented in the memory 150 of the node device 100. In some embodiments, the blockchain state database 200 may be implemented as a separate node constituting the blockchain network other than the node device 100.

The transaction cost determiner 134 according to some embodiments calculates a minimum transaction cost that satisfies the user's requirements by using the estimated time of transaction processing completion calculated by the blockchain state monitor 132. In some embodiments, the user's requirements may include a transaction processing completion deadline on the blockchain network. In such embodiments, the transaction cost determiner 134 may calculate a minimum transaction cost such that the calculated estimated time of transaction processing completion falls within a transaction processing completion deadline required by the user.

In some embodiments, the user's requirements may further include a transaction processing time in addition to the transaction processing completion deadline. The transaction processing time is a time required for a transaction to be processed, and may refer to a time required purely for processing, except for waiting time due to another transaction being processed first. In such embodiments, the transaction cost determiner 134 may calculate a minimum transaction cost such that a result of subtracting the transaction processing time from the transaction processing completion deadline requested by the user (e.g., a transaction processing delay time allowed by the user except for the transaction processing time) exceeds or is equal to the estimated time of transaction processing completion. For example, the minimum transaction cost may be calculated by Equation 1 below.

$$\min\{x | d - e \geq bi(x)\} \quad \text{[Equation 1]}$$

Here, x denotes a transaction cost, bi(x) denotes an estimated time of transaction processing completion of an i-th cycle according to the transaction cost x, d denotes a transaction completion deadline, and e denotes a transaction processing time.

According to some embodiments, when a first transaction processing request, which pays a transaction cost equal to or greater than a minimum transaction cost calculated by the transaction cost determiner 134, is generated by the user, the transaction processor 136 processes the user's transaction in response to the first transaction processing request. On the other hand, when a second transaction processing request, which pays a transaction cost less than the calculated minimum transaction cost, is generated by the user, the transaction processor 136 may request the user to pay a transaction cost equal to or greater than the calculated minimum transaction cost, or may notify the user of the inability to process the transaction.

Figure 3:
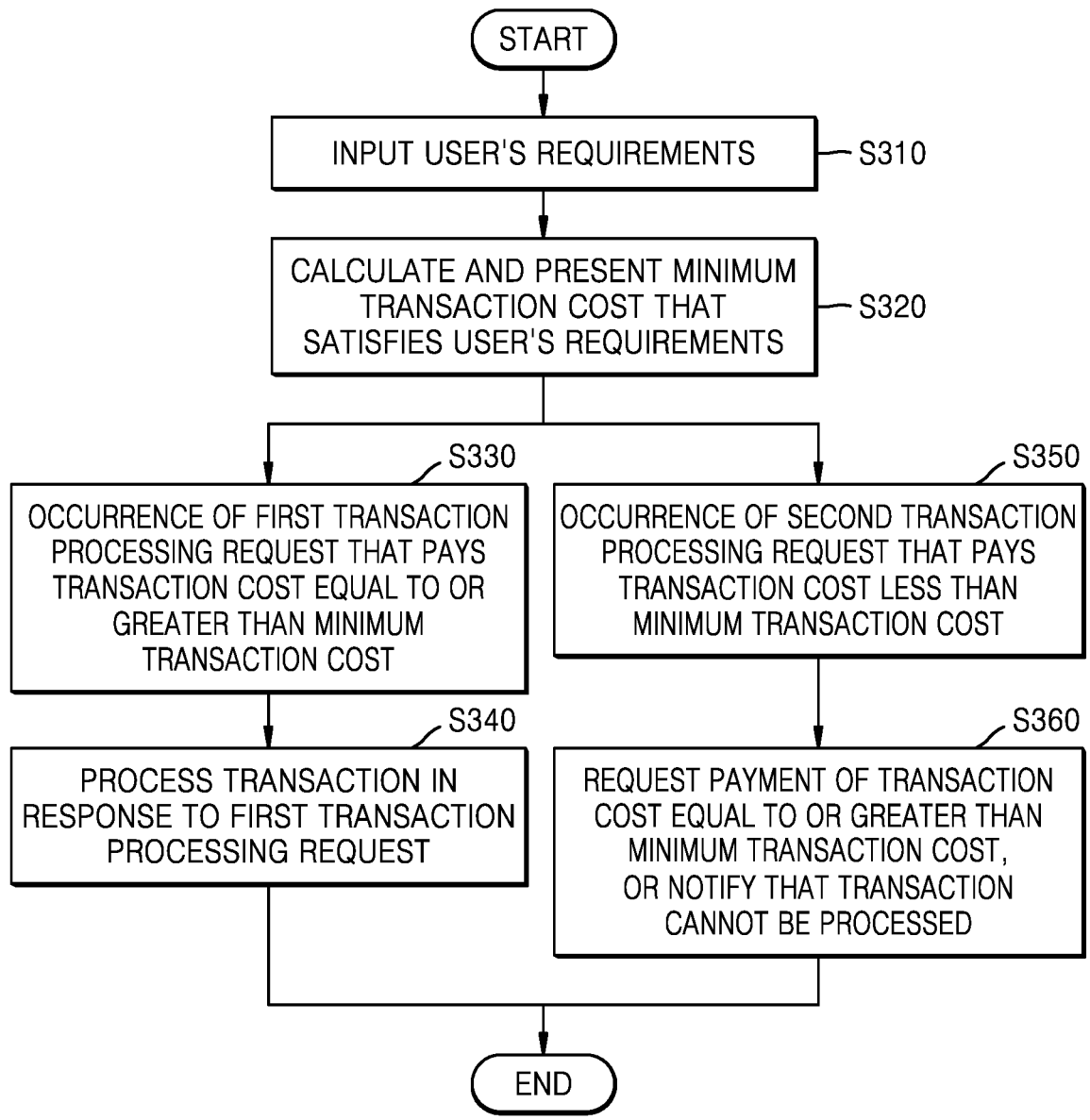
FIG. 3 is a flowchart illustrating an operation of a node device, according to some embodiments.

FIG. 3 is a flowchart illustrating an operation of the node device 100, according to some embodiments.

A user's requirements for transaction processing may be input to the node device 100 through the user input unit 110 (Operation S310). The node device 100 may calculate and present a minimum transaction cost that satisfies the user's requirements (e.g., output through the output unit 120) (Operation S320). The user who confirms the minimum transaction cost may enter a transaction processing request that pays a predetermined transaction cost. When a first transaction processing request, which pays a transaction cost equal to or greater than a minimum transaction cost calculated by the node device 100, occurs (Operation S330), the node device 100 may process a transaction in response to the first transaction processing request (Operation S340). On the other hand, when a second transaction processing request, which pays a transaction cost less than the minimum transaction cost, occurs (Operation S350), the node device 100 may request payment of a transaction cost equal to or greater than the minimum transaction cost, or may notify that the transaction cannot be processed (Operation S360).

In the above, embodiments of a case where the user may input requirements before specifying a transaction cost and may receive a minimum transaction cost that satisfies the user's requirements from the node device 100 have been described. Hereinafter, embodiments of a case where the user specifies a transaction cost in addition to inputting requirements will be described. However, detailed descriptions of components which operate in the same manner as or similarly to those of the above-described embodiments will be omitted.

As described above, the blockchain state monitor 132 calculates an estimated time of transaction processing completion according to a transaction cost by using state information about the blockchain network. According to some embodiments, the blockchain state monitor 132 may periodically calculate the estimated time of transaction processing completion according to the transaction cost. The estimated time of transaction processing completion may refer to an estimated time until a block including a transaction is added to the blockchain after a request for the processing of the transaction occurs.

According to some embodiments, the transaction cost determiner 134 may determine whether the user's requirements are satisfied according to a transaction cost presented by the user by using the estimated time of transaction processing completion calculated by the blockchain state monitor 132. In some embodiments, the user's requirements may include a transaction processing completion deadlines on the blockchain network. In such embodiments, the transaction cost determiner 134 may determine whether the estimated time of transaction processing completion according to the transaction cost presented by the user falls within a transaction completion deadline requested by the user.

In some embodiments, the user's requirements may further include a transaction processing time in addition to the transaction processing completion deadline. The transaction processing time is a time required for a transaction to be processed, and may refer to a time required purely for processing, except for waiting time due to another transaction being processed first. In such embodiments, the transaction cost determiner 134 may determine whether a result of subtracting the transaction processing time from the transaction processing completion deadline requested by the user (e.g., a transaction processing delay time allowed by the user except for the transaction processing time) exceeds or is equal to the estimated time of transaction processing completion according to the transaction cost presented by the user.

The transaction processor 136 according to some embodiments responds to the user's transaction processing request according to whether the user's requirements are satisfied. In some embodiments, when the user's requirements are satisfied, the transaction processor 136 may process the user's transaction in response to the user's transaction processing request. For example, the case where the user's requirements are satisfied may be a case where the estimated time of transaction processing completion according to the transaction cost presented by the user falls within a transaction processing completion deadline requested by the user. As another example, the case where the user's requirements are satisfied may be a case where a result of subtracting the transaction processing time from the transaction processing completion deadline requested by the user exceeds or is equal to the estimated time of transaction processing completion according to the transaction cost presented by the user.

In some embodiments, when the user's requirements are not satisfied, the transaction processor 136 may request the user to pay a transaction cost greater than the transaction cost presented by the user, in response to the user's transaction processing request, or may notify the user of the inability to process the transaction. For example, the case where the user's requirements are not satisfied may be a case where the estimated time of transaction processing completion according to the transaction cost presented by the user does not fall within the transaction processing completion deadline requested by the user. As another example, the case where the user's requirements are not satisfied may be a case in which a result of subtracting the transaction processing time from the transaction processing completion deadline requested by the user is less than the estimated time of transaction processing completion according to the transaction cost presented by the user.

Figure 4:
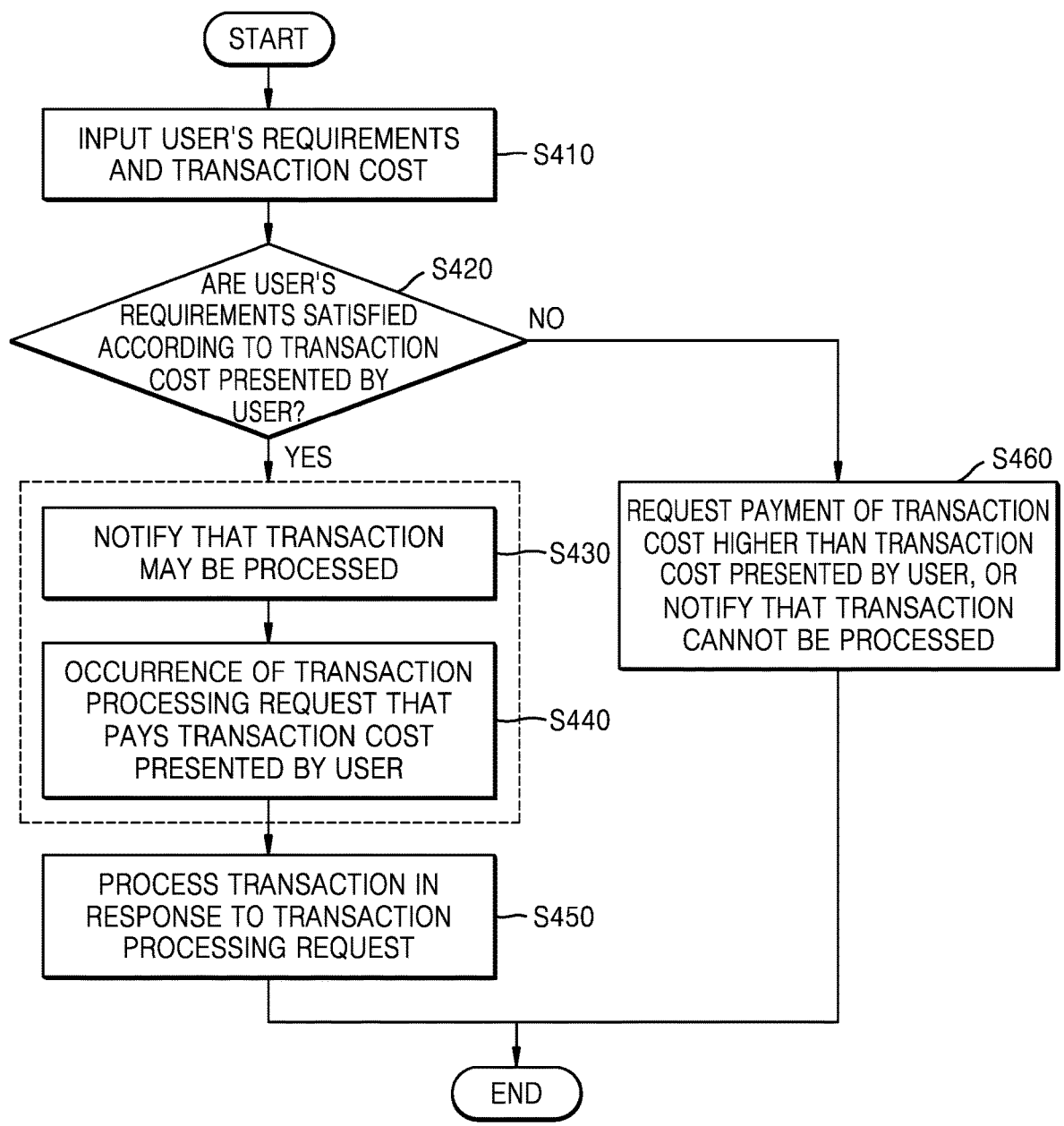
FIG. 4 is a flowchart illustrating an operation of a node device, according to some embodiments.

FIG. 4 is a flowchart for describing an operation of the node device 100, according to some embodiments.

A user's requirements for transaction processing and a transaction cost may be input to the node device 100 through the user input unit 110 (Operation S410). The node device 100 may determine whether the user's requirements may be satisfied according to the transaction cost presented by the user (Operation S420). When the user's requirements are satisfied as a result of the determination in Operation S420, the node device 100 may process a transaction in response to a transaction processing request (Operation S450). In this case, the transaction processing request may be generated together with the user's requirement input in Operation S410. In another embodiment, when the user's requirements are satisfied, the node device 100 may first notify the user that a transaction may be processed (Operation S430), and when a transaction processing request that pays the transaction cost presented by the user occurs later (Operation S440), the node device 100 may process the transaction in response to the transaction processing request. On the other hand, when the user's requirements are not satisfied as a result of the determination in Operation S420, the node device 100 may request payment of a transaction cost higher than the transaction cost presented by the user in Operation S410, or may notify that the transaction cannot be processed (Operation S460).

A node device on a blockchain network according to embodiments of the present disclosure may process a transaction to satisfy a user's requirements at a minimum transaction cost by using state information about the blockchain network and the user's requirements. In addition, the node device according to embodiments of the present disclosure may allow a transaction to be processed within a deadline required by the user at a minimum transaction cost. Accordingly, the node device according to embodiments of the present disclosure may enable real-time data processing in a blockchain application field.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A node device on a blockchain network, the node device comprising:
   a blockchain state monitor that calculates an estimated time of transaction processing completion according to a transaction cost by using state information about the blockchain network;
   a transaction cost determiner that calculates a minimum transaction cost that satisfies a user's requirements for transaction processing by using the calculated estimated time of transaction processing completion; and
   a transaction processor that processes a transaction of the user in response to a first transaction processing request when the first transaction processing request, which pays a transaction cost equal to or greater than the minimum transaction cost, is generated by the user,
   wherein the user's requirements include a transaction processing completion deadline on the blockchain network, and
   wherein the transaction cost determiner calculates the minimum transaction cost such that the estimated time of transaction processing completion falls within the transaction processing completion deadline.

2. The node device of claim 1, wherein the user's requirements further include a transaction processing time on the blockchain network,
   wherein the transaction cost determiner calculates the minimum transaction cost such that a result of subtracting the transaction processing time from the transaction processing completion deadline exceeds or is equal to the estimated time of transaction processing completion.

3. The node device of claim 1, wherein the transaction processor requests the user to pay a transaction cost equal to or greater than the minimum transaction cost or notifies the user of inability to process the transaction, when a second transaction processing request, which pays a transaction cost less than the minimum transaction cost, is generated by the user.

4. The node device of claim 1, wherein the state information about the blockchain network includes at least one of a block generation cycle, a block generation time, a transaction processing request frequency, and the number of transactions being processed.

5. A node device on a blockchain network, the node device comprising:
- a blockchain state monitor that calculates an estimated time of transaction processing completion according to a transaction cost by using state information about the blockchain network;
- a transaction cost determiner that determines whether a user's requirements are satisfied according to a transaction cost presented by the user by using the calculated estimated time of transaction processing completion; and
- a transaction processor responsive to a transaction processing request of the user according to whether the user's requirements are satisfied,
- wherein the user's requirements include a transaction processing completion deadline on the blockchain network, and
- wherein the transaction cost determiner determines whether an estimated time of transaction processing completion according to the transaction cost presented by the user falls within the transaction processing completion deadline.

6. The node device of claim 5, wherein the user's requirements further include a transaction processing time on the blockchain network,
- wherein the transaction cost determiner determines whether a result of subtracting the transaction processing time from the transaction processing completion deadline exceeds or is equal to an estimated time of transaction processing completion according to the transaction cost presented by the user.

7. The node device of claim 5, wherein the transaction processor processes a transaction of the user in response to the transaction processing request of the user when the user's requirements are satisfied.

8. The node device of claim 5, wherein the transaction processor requests the user to pay a transaction cost greater than the transaction cost presented by the user, in response to the transaction processing request of the user, or notifies the user of inability to process the transaction, when the user's requirements are not satisfied.

9. The node device of claim 5, wherein the state information about the blockchain network includes at least one of a block generation cycle, a block generation time, a transaction processing request frequency, and the number of transactions being processed.

* * * * *